(12) United States Patent
Zhao et al.

(10) Patent No.: US 11,110,728 B2
(45) Date of Patent: Sep. 7, 2021

(54) SELF-DRIVING SYSTEM WITH RFID READER AND BUILT-IN PRINTER

(71) Applicant: LINGDONG TECHNOLOGY (BEIJING) CO. LTD, Beijing (CN)

(72) Inventors: Ziran Zhao, Beijing (CN); Xin Hou, Beijing (CN)

(73) Assignee: LINGDONG TECHNOLOGY (BEIJING) CO. LTD, Beijing (CN)

( * ) Notice: Subject to any disclaimer, the term of this patent is extended or adjusted under 35 U.S.C. 154(b) by 0 days.

(21) Appl. No.: 16/731,697

(22) Filed: Dec. 31, 2019

(65) Prior Publication Data
US 2021/0023866 A1 Jan. 28, 2021

Related U.S. Application Data

(60) Division of application No. 16/529,490, filed on Aug. 1, 2019, which is a continuation of application No. PCT/CN2019/097636, filed on Jul. 25, 2019.

(51) Int. Cl.
| | |
|---|---|
| *B41J 29/38* | (2006.01) |
| *G05D 1/00* | (2006.01) |
| *G05D 1/02* | (2020.01) |
| *G06K 7/10* | (2006.01) |
| *B41J 3/407* | (2006.01) |

(52) U.S. Cl.
CPC ............ *B41J 29/38* (2013.01); *B41J 3/4075* (2013.01); *G05D 1/0088* (2013.01); *G05D 1/0094* (2013.01); *G05D 1/0246* (2013.01); *G06K 7/10366* (2013.01); *G05D 2201/0216* (2013.01)

(58) Field of Classification Search
None
See application file for complete search history.

(56) References Cited

U.S. PATENT DOCUMENTS

2002/0194075 A1* 12/2002 O'Hagan ............. G06Q 20/202
  705/21
2013/0015242 A1* 1/2013 White ................ G06K 7/10554
  235/383

(Continued)

FOREIGN PATENT DOCUMENTS

| CN | 102831739 | 12/2012 |
|---|---|---|
| CN | 103577853 | 2/2014 |

(Continued)

OTHER PUBLICATIONS

The Office Action of U.S. Appl. No. 16/529,490 dated Mar. 2, 2021.

(Continued)

*Primary Examiner* — Todd Melton
*Assistant Examiner* — Jason R Roberson
(74) *Attorney, Agent, or Firm* — NZ Carr Law Office, PLLC (57) ABSTRACT

Embodiments of the present disclosure relate to a self-driving system having an RFID reader and a built-in printer. In one embodiment, a self-driving system includes a mobile base having one or more motorized wheels, the mobile base having a first end and a second end opposing the first end, a console coupled in an upright position to the first end of the mobile base, and a tag reader integrated with the console, the tag reader having a sensor surface facing upwardly.

17 Claims, 8 Drawing Sheets

(56) References Cited

U.S. PATENT DOCUMENTS

| | | | |
|---|---|---|---|
| 2014/0081766 A1 | 3/2014 | Maass | |
| 2017/0344058 A1 | 11/2017 | Kim | |
| 2018/0039803 A1* | 2/2018 | Elizondo, II | ........... G16H 20/13 |
| 2018/0253107 A1* | 9/2018 | Heinla | ................. G05D 1/0088 |
| 2019/0073656 A1* | 3/2019 | Joseph | ............. G06Q 20/40145 |
| 2019/0094876 A1 | 3/2019 | Moore et al. | |

FOREIGN PATENT DOCUMENTS

| | | |
|---|---|---|
| CN | 104603850 | 5/2015 |
| CN | 106250953 | 12/2016 |
| CN | 207670462 | 7/2018 |
| CN | 207976968 | 10/2018 |
| CN | 108848641 | 11/2018 |
| CN | 109367608 | 2/2019 |
| CN | 109367608 A * | 2/2019 |
| CN | 109740700 | 5/2019 |

OTHER PUBLICATIONS

The search report of the corresponding CN Patent Application No. 2019800016458 (with English Summary) dated Mar. 16, 2020.
The search report of the corresponding CN Patent Application No. 2019800016458 (with English Summary) dated Jul. 9, 2020.
The Office Action of the corresponding U.S. Appl. No. 16/529,490 dated Apr. 17, 2020.

* cited by examiner

SELF-DRIVING SYSTEM WITH RFID READER AND BUILT-IN PRINTER

CROSS-REFERENCE TO RELATED APPLICATIONS

This application is a divisional application of co-pending U.S. patent application Ser. No. 16/529,490, filed on Aug. 1, 2019, which herein is incorporated by reference.

BACKGROUND

Field

Embodiments disclosed herein relate to improved self-driving systems with printing and radio frequency identification (RFID) reading capability.

Description of the Related Art

Self-driving systems such as Autonomous Mobile Robots (ARMs) or Automatic Guided Vehicles (self-driving systems) are driverless, programmable controlled system that can transport a load over long distances. Self-driving systems can provide a safer environment for workers, inventory items, and equipment with precise and controlled movement. Some develops have incorporated electronics to the self-driving systems for identifying objects via RFID technology. However, such design can cause inventory related issues due to unintended reading of RFID tags on the objects and/or shelves that may present along the route of traveling without worker's knowledge. Therefore, there exists a need for improved self-driving systems for identification of objects with minimized interference.

SUMMARY

Embodiments of the present disclosure include self-driving systems having an RFID reader and built-in printer. In one embodiment, a self-driving system is provided. The self-driving system includes a mobile base having one or more motorized wheels, the mobile base having a first end and a second end opposing the first end, a console coupled in an upright position to the first end of the mobile base, and a tag reader integrated with the console, the tag reader having a sensor surface facing upwardly.

In another embodiment, a self-driving system is provided. The self-driving system includes a mobile base having one or more motorized wheels, a console coupled in an upright position to the mobile base, and a printer integrated with the console.

In yet another embodiment, a self-driving system is provided. The self-driving system includes a mobile base having one or more motorized wheels, a console having a display, the console coupling in an upright position to the mobile base, a RFID reader coupled to the console, the RFID reader having a sensor surface operable to read RIFD tags placed on, over, or directly over the sensor surface, a printer coupled to the console, the printer has a paper discharge port disposed at a side of the console, and an image sensing camera disposed at the console, the image sensing camera being pointed forward and down.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized with other embodiments without specific recitation.

DETAILED DESCRIPTION

Embodiments of the present disclosure relate to self-driving systems having an RFID reader and a built-in printer. The RFID reader is faced up so that only RFID tags over the RFID reader can be read. The built-in printer is responsive to the RFID tags scanned for printing a shipping label. The self-driving system also includes a down-forward facing camera for obstacle avoidance. It should be understood that while the term "self-driving system" is used in this disclosure, the concept of various embodiments in this disclosure can be applied to any self-driving vehicles and mobile robots, such as autonomously-navigating mobile robots, inertially-guided robots, remote-controlled mobile robots, and robots guided by laser targeting, vision systems, or roadmaps. Various embodiments are discussed in greater detail below with respect to FIGS. 1-9.

Figure 1:
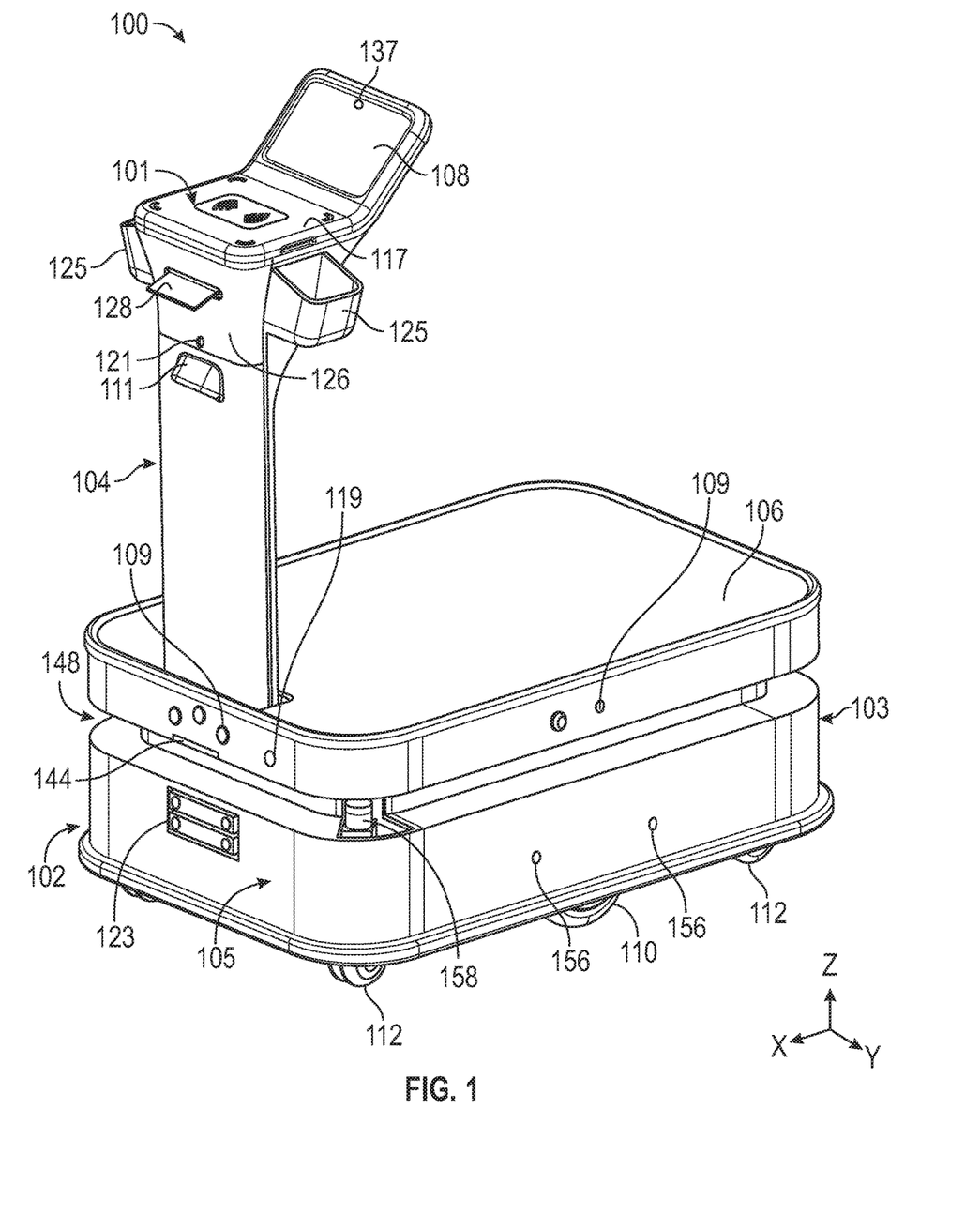
FIG. 1 is a perspective view of a self-driving system according to one embodiment of the present disclosure.
Figure 2:
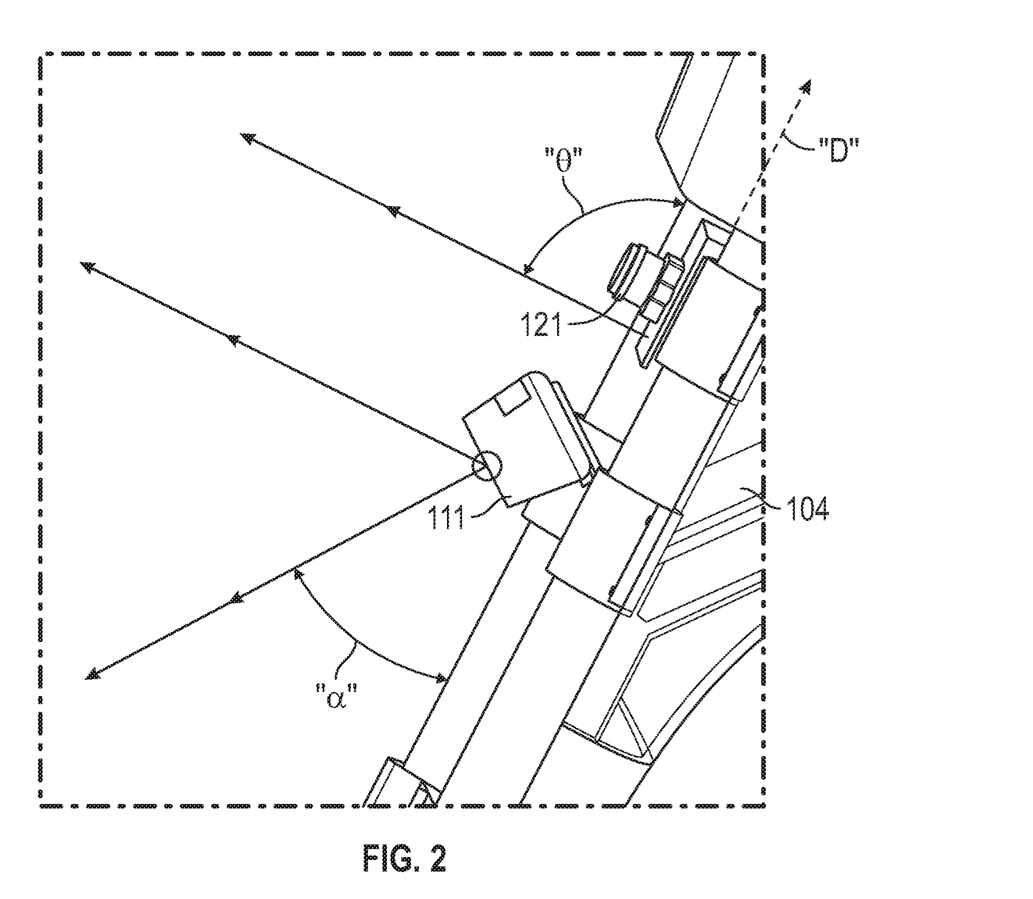
FIG. 2 is an enlarged view of FIG. 1 showing a portion of the self-driving system according to one embodiment of the present disclosure.

FIG. 1 is a perspective view of a self-driving system 100 according to one embodiment of the present disclosure. The self-driving systems can be used as package carriers in various operating systems, such as warehouses, hospitals, airports, and other environments that may use automated package transportation. The self-driving system 100 generally includes a mobile base 102 and a console 104. The mobile base 102 has a rear end 103 and a front end 105 opposing the rear end 103. The console 104 is coupled to the front end 105 of the mobile base 102 in a standing or upright configuration. If desired, the mobile base can move up and down vertically using one or more actuators embedded inside the mobile base.

The self-driving system 100 is capable of moving autonomously between designated areas within a facility based on pre-stored commands or instructions received from a remote server. The remote server may include a warehouse management system. The mobility of the self-driving system 100 is achieved through one or more motorized wheels 110 and a plurality of stabilizing wheels 112. The motorized wheels 110 are configured to rotate and/or roll in any given direction to move the self-driving system 100. For example, the motorized wheels 110 can rotate about the Z-axis and roll forward or backward on the ground about its axel spindle along any directions, such as along the X-axis or along the Y-axis. The motorized wheels 110 may be controlled to roll at different speed. The stabilizing wheels 112 may be caster-type wheels. If desired, any or all of the stabilizing wheels 112 may be motorized. In this disclosure, moving forward refers to the situation when the front end 105 is the leading end and moving backward refers to the situation when the rear end 103 is the leading end. The self-driving system 100 has one or more emergency stop button 119 configured to stop a moving self-driving system when pressed.

A display 108 is coupled to the console 104 and configured to display information. The display 108 can be any suitable user input device for providing information associated with operation tasks, map of the facility, routing information, inventory information, and inventory storage, etc. The display 108 also allows a human operator to control the operation of the self-driving system 100. If manual use of the self-driving system is desired, the operator can override the automatic operation of the self-driving system 100 by entering updated commands via the display 108.

The self-driving system 100 includes one or more cameras configured to capture images and/or videos of the surroundings of the self-driving system 100. The camera may be disposed at the console 104 (e.g., camera 121) and/or at the display 108 (e.g., camera 137). The cameras 121, 137 face away from the rear end 103 of the self-driving system 100. The cameras 121, 137 can be disposed at other locations of the self-driving system 100 facing sideways to achieve the same purposes.

In some examples, the camera 137 can be a people/object recognition camera used to identify the operator and/or the object (e.g., items with RFID tag). The camera 121 can be an overview camera used to detect a shelf and/or a human operator so that a proper/pre-determined distance is maintained between the self-driving system 100 and the operator under various operation modes. In one example shown in FIG. 2, the camera 121 points to a direction that is at an angle "δ" with respect to the longitudinal direction "D" of the console 104. The angle "δ" may be in a range from about 60 degrees to about 125 degrees, such as about 80 degrees to about 105 degrees, for example about 90 degrees. It is contemplated that any suitable angle can be used depending on the needs.

The camera 121, 137 may include a monocular camera, a binocular camera, and/or a stereo camera and can be configured to detect the operator, capture the image of the operator, and abstract the characteristics of the operator, such as facial features of the operator, a shape of the operator, bone structures of the operator, a pose/gesture of the operator, the clothing of the operator, or any combination thereof, for purpose of following the operator while maintaining a pre-determined distance with the operator in any given direction. To follow the operator, the self-driving system 100 may move forward, with the front end 105 as the leading end, i.e., the console 104 facing the operator. If the self-driving system 100 was moving backward previously, for example under the self-navigating mode or the leading mode, the self-driving system 100 may turn to move forward after switching to the following mode. If desired, any of the cameras 121, 137 can be configured as a steerable camera to rotate in both horizontal and vertical directions, allowing the self-driving system 100 to continuously follow the operator or any type of object—even if an obstacle is in the moving path of the self-driving system 100.

In some embodiments, which can be combined with any other embodiments discussed in this disclosure, the self-driving system 100 includes one or more depth image sensing cameras, such as Time-of-Flight (ToF) cameras. The depth image sensing cameras can be used for object identification and/or obstacle avoidance. The self-driving system 100 may have one or more depth image sensing cameras 144 disposed at the front end 105 and/or rear end 103 of the mobile base 102. In some embodiments, the self-driving system 100 may have one or more depth image sensing cameras 111 disposed at the front end 105 and/or rear end 103 of the console 104.

For effective capture of object/obstacle that may present along the route of traveling, such as pallets or other low-profile objects, the depth image sensing cameras (e.g., depth image sensing camera 111) may point forward and down (i.e., a down-forward facing camera). In one example shown in FIG. 2, the depth image sensing camera 111 points to a direction that is at an angle "α" with respect to the longitudinal direction "D" of the console 104. The angle "α" may be in a range from about 30 degrees to about 85 degrees, such as about 40 degrees to about 65 degrees, for example about 45 degrees. The depth image sensing camera 144 may point forward (i.e., a front-facing camera). In one example, the depth image sensing camera 144 is pointed to a direction that is at an angle "β" with respect to the longitudinal direction "D" of the console 104. The angle "β" can be identical to angle "θ" discussed above, or adjusted to any suitable angle depending on the needs. In one example, the angle "β" is about 90 degrees.

The self-driving system 100 may include one or more proximity sensors to detect the presence of objects nearby and/or measure distances from the objects nearby. For example, one or more sensors 156 may be provided around the mobile base 102 (only two sides are shown). The sensors 156 may be any suitable sonar sensors, ultrasonic sensors, infrared sensors, radar sensors, LiDAR sensors and/or any suitable proximity sensors that can be configured to detect the presence of nearby objects. Each sensor 156 can be configured to sense a field of view greater about 90 degrees.

In some embodiments, one or more sensors 109 are further provided at the front end 105 and the rear end 103 of mobile base 102, respectively, for obstacle avoidance. Alternatively or additionally, a sensor 158 can be disposed at a cutout 148 extended around the body of the mobile base 102. The extension of the cutout 148 allows the sensors to provide greater sensing area for the self-driving system 100. The sensor 158 may be disposed at one or more corners of the mobile base 102. The sensor 109, 158 may be any suitable sonar sensors, ultrasonic sensors, infrared sensors, radar sensors, and/or laser sensors such as LiDAR (light detection and ranging) sensors, or any combination thereof. Each sensor can be configured to sense a field of view greater about 90 degrees, for example about 270 degrees.

The combination of the information recorded, detected, and/or measured by the cameras 111, 121, 137, 144 and/or sensors 109, 156, 158 can also be used to help autonomously move the self-driving system 100 in a given direction with the operator while avoiding nearby obstacles, and/or autonomously maintain the self-driving system 100 in a front, rear, or side follow position to the operator. Embodiments of the self-driving system 100 can include any combination, number, and/or location of cameras 111, 121, 137, 144 and/or sensors 109, 156, 158 coupled to the mobile base 102 and/or the console 104, depending on the application.

A charging pad 123 can be provided at the front end 105 or rear end 103 of the mobile base 102 to allow automatic charging of the self-driving system 100 upon docking of the self-driving system 100 with respect to a charging station (not shown).

In some embodiments, the console 104 is integrated with a RFID reader 101. The RFID reader 101 can be disposed at the console 104. The RFID reader 101 has a sensor surface 117 facing upwardly to interrogate the presence of items placed on, over, or directly over the sensor surface 117 by wirelessly detecting and reading unique RFID tags attached to each item. The sensor surface 117 is sized to facilitate easy placement of items thereon. In some examples, one or more cameras (e.g., people/object recognition camera 137) may turn on or remain on during operation of the self-driving system 100 to allow reading RFID tags and identifying item(s) concurrently or sequentially. The term RFID reader or tag reader used in this disclosure refers to any device capable of automatically identifying tags attached to objects using electromagnetic energy or the like. The tags may be inductively coupled or capacitively coupled RFID tags containing electronically stored information.

In one example, the sensor surface 117 is pointed to a direction that is parallel to the longitudinal direction "D" of the console 104. In most cases, the sensor surface 117 points to a direction that is perpendicular to the ground or traveling direction of the self-driving system 100. The longitudinal direction of the display 108 may be held at an angle of about 105 degrees to about 165 degrees, such as about 120 degrees to about 150 degrees, with respect to the sensor surface 117 of the RFID reader 101. As will be discussed in more detail with respect to FIG. 7, the RFID reader 101 is arranged so that only items positioned on or over the RFID reader 101 can be read.

One or more baskets 125 can be provided to the console 104 of the self-driving system 100. The baskets 125 may be disposed at the opposing sides of the console to help the operator store tools needed for packing, such as scissors and tapes.

The self-driving system 100 is also integrated with a printer 126. The printer 126 can be disposed at any desired location of the console 104, such as at the top portion of the console 104 near the RFID reader 101. The printer is responsive to the RFID tags scanned by the RFID reader 101 for printing a label. The printer can communicate with the remote server, such as the remote server 940 to be discussed in FIG. 9, to receive and/or print additional information associated with the item. The label may be a peel-type laminated label material which can be peeled off to expose an adhesive backing. The label is printed through a paper discharge port 128, which may be located at the front end 105 of the console 104. Once the label is printed, the operator can peel the back off of the label and place the label on the item, or a box containing the items that is to be shipped. The label may contain the information about the recipient such as the name, shipping address, etc., that is provided by the operator and/or received from the remote server.

The built-in printer allows the operator to label and pack the items to be shipped at the self-driving system 100. Once all the items have been labeled and packed, the operator can send the self-driving system 100 that is loaded with the packed items directly to a shipping area. As opposed to the conventional approach in which the collected items are manually sent to a packing area by a hand truck for labeling/packing and then to the shipping area, the operator can scan, label and pack the items to be shipped right at the self-driving system 100, which are then sent directly to the shipping area. Self-driving systems having a built-in printer thus cut down the overall shipping time associated with order(s) because the shipped items are collected, scanned, packed and transported quickly on a time-efficient basis. As a result, the overhead cost for the manufacturer is reduced.

Figure 3:
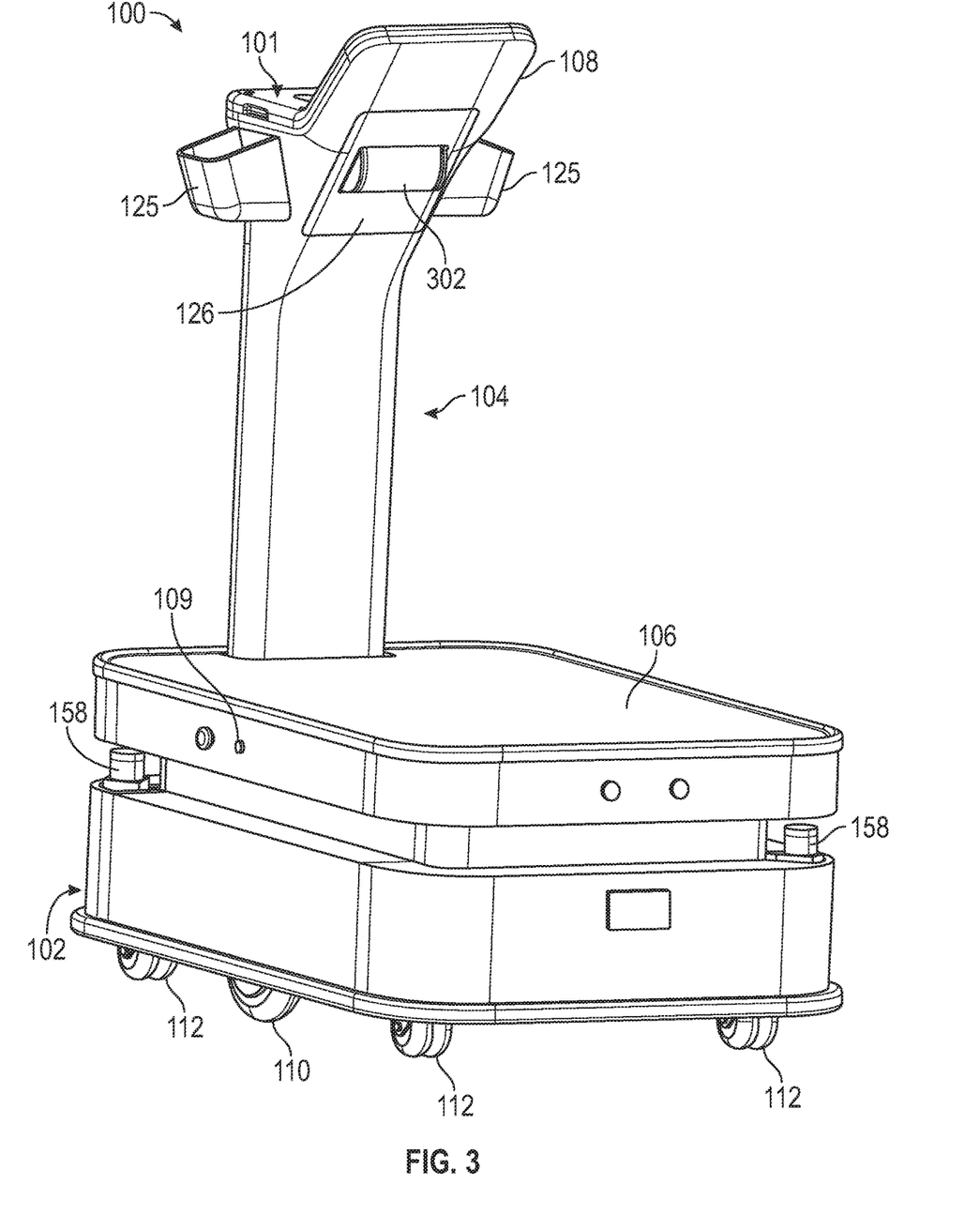
FIG. 3 is another perspective view of the self-driving system of FIG. 1.
Figure 4:
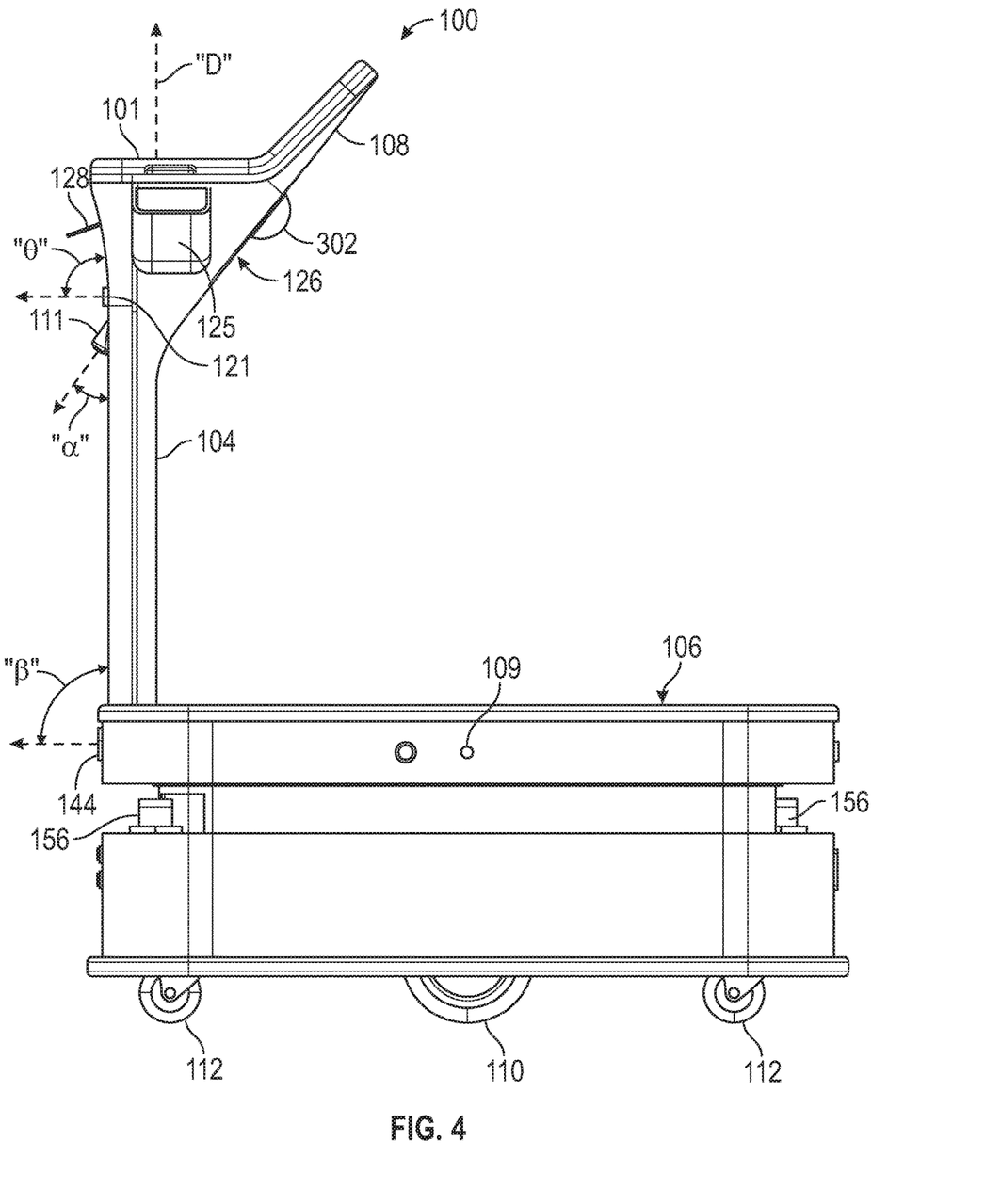
FIG. 4 is a side view of the self-driving system of FIG. 1.
Figure 5:
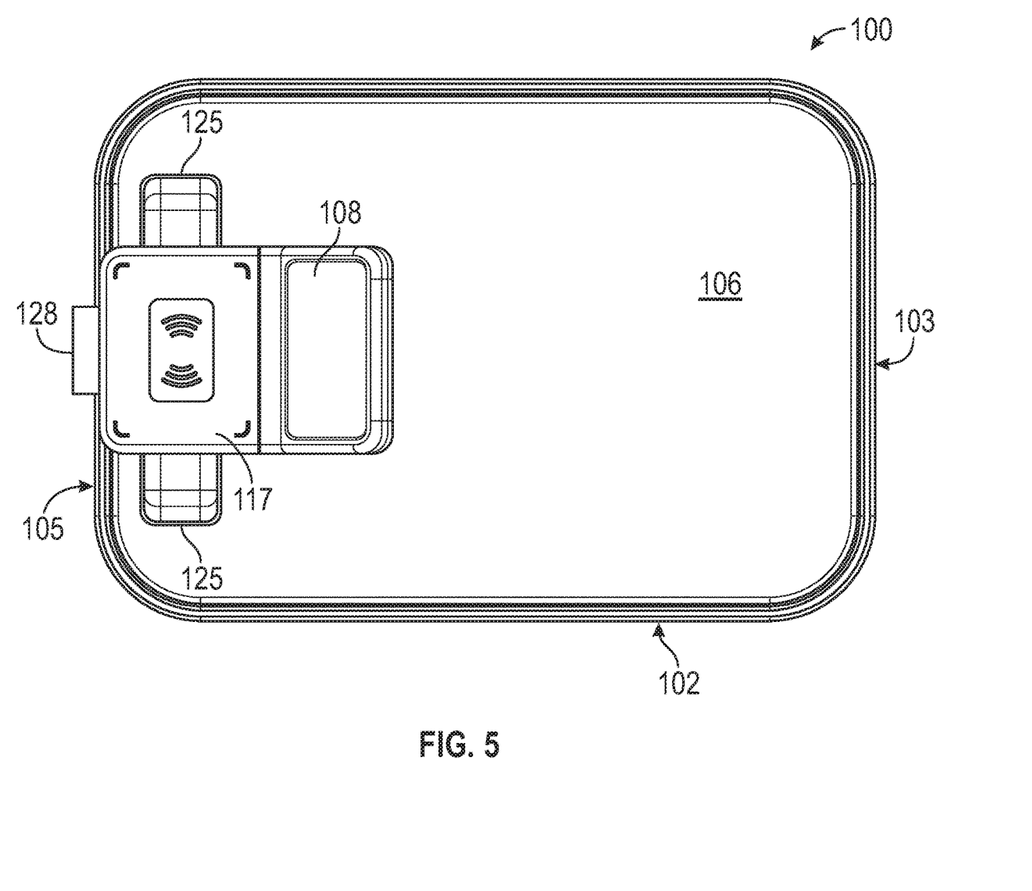
FIG. 5 is a top view of the self-driving system of FIG. 1.
Figure 6:
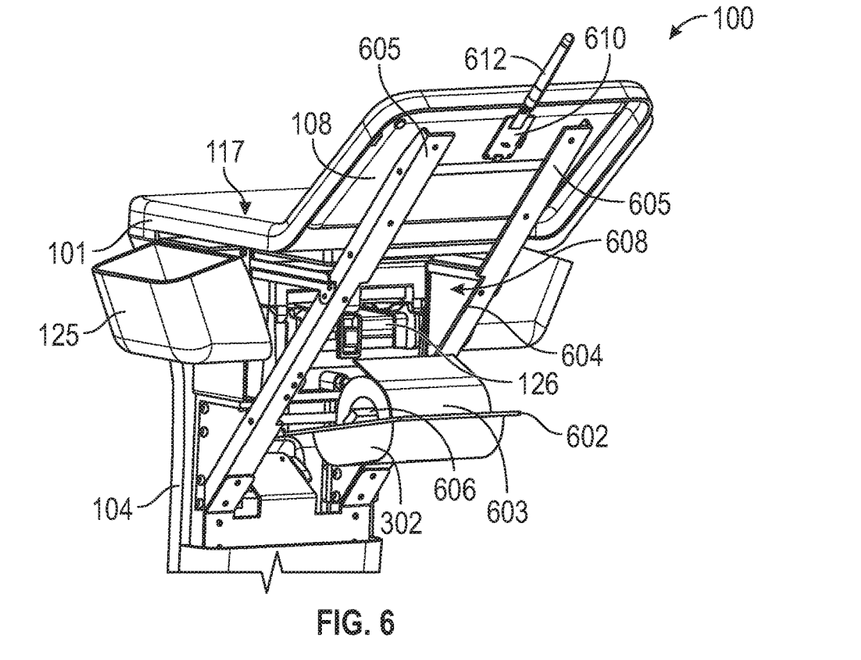
FIG. 6 illustrates a perspective view of a portion of the self-driving system showing a roll paper feeder in a fully opened position.

FIG. 3 is another perspective view of the self-driving system 100. FIG. 4 is a side view of the self-driving system 100. FIG. 5 is a top view of the self-driving system 100. FIGS. 3 and 4 further illustrate a roll paper feeder 302 coupling to the built-in printer 126. The roll paper feeder 302 may be disposed at the back side of the console 104. The roll paper feeder 302 can be opened for loading new paper sheet for label printing. FIG. 6 illustrates a perspective view of a portion of the self-driving system 100 showing the roll paper feeder 302 in a fully opened position. The roll paper feeder 302 includes a cover 602 for covering an opening 604 on the back side of the console 104. The cover 602 has a profile shaped in accordance with a roll of the paper sheet 603. The roll paper feeder 302 can be closed and opened by pulling the cover 602 up and down. The cover 602 can be engaged or disengaged from the back side of the console 104 through a locking mechanism (not shown). When releasing the lock, the cover 602 falls down and towards the rear end 103 of the self-driving system 100 by, for example a spring force, to expose the roll of the paper sheet 603.

The roll of the paper sheet 603 is removably supported by a shaft or rod 606 attached to the cover 602 for ease of replacement. When the cover 602 is at a closing position, the roll of the paper sheet 603 can store within a housing 608 of the console 104. The housing 608 has a pair of supporting frame 605 extending from the display 108 to the upper portion of the console 104. The supporting frame 605 can be coupled to the back side of the display 108 and the console 104 by screws or any suitable manner.

When the RFID reader 101 detects a RFID tag of an item and confirmed by the operator, a printing request will be sent to the printer 126 to print the paper sheet (i.e., shipping label). The printed paper sheet then advances towards the paper discharge port 128 (FIG. 1) for releasing the printed paper sheet.

The self-driving system 100 includes a positioning device 610 coupled to the console 104. In one example, the positioning device 610 is disposed at the back side of the display 108. The positioning device 610 is configured to communicate information regarding position of the self-driving system 100 to the remote server. The positioning device 610 can be controlled by a circuit board, which includes at least a communication module, disposed in the console 104. The position information and task instructions (if any) may be sent to the communication module wirelessly over an internet, through a wired connection, or using any suitable manner to communicate with the remote server. Examples of wireless communication may include, but are not limited to, ultra-wideband (UWB), radio frequency identification (active and/or passive), Bluetooth, WiFi, and/or any other suitable form of communication using IoT technology.

In one embodiment, the positioning device 610 is an UWB based device 610. Ultra-wideband described in this disclosure refers to a radio wave technology that uses low energy for short-range, high-bandwidth communications over a large portion of the radio spectrum, which includes frequencies within a range of 3 hertz to 3,000 gigahertz. The UWB based device 610 has a wireless transceiver 612 (which may include three antennas), which is configured to receive signals (such as a radio frequency wave) from one or more UWB tags that can be placed at various locations of the facility, such as on the shelves or building poles of a warehouse. The signal is communicated by a transmitter of the UWB tags to the transceiver 612 to determine the position of the self-driving system 100 relative to the UWB tags.

Figure 7:
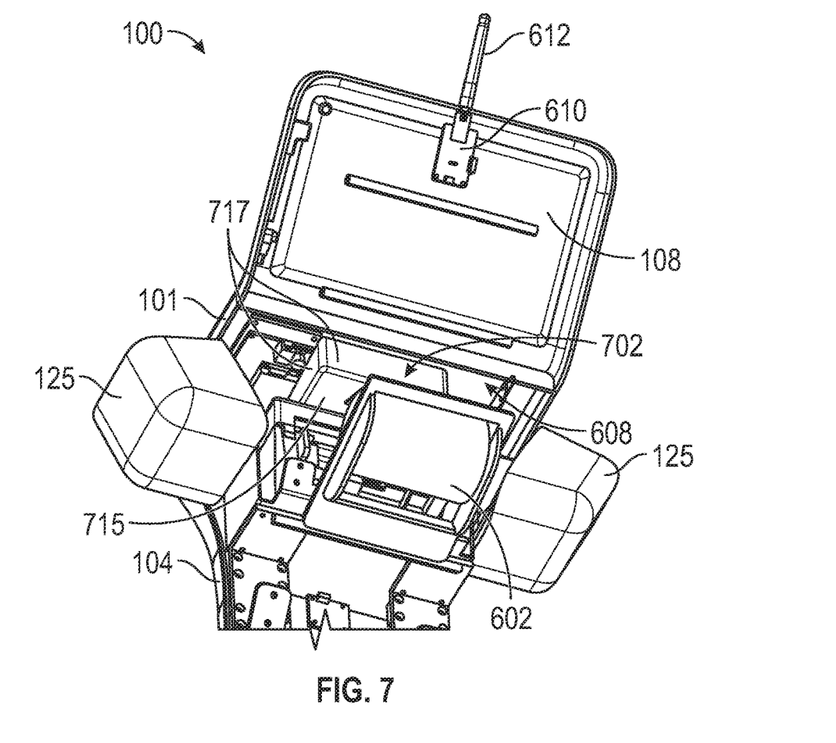
FIG. 7 illustrates a perspective view of a portion of the console according to one embodiment of the present disclosure.

FIG. 7 illustrates a perspective view of a portion of the console 104 according to one embodiment. The RFID reader 101 is disposed in a holder 702. The holder 702 is located below the sensor surface 117 of the RFID reader 101. The holder 702 can have an opening, a bottom 715 opposing the opening, and four side walls 717 extending upwardly from the bottom 715. The side walls 717 and the bottom 715 of the holder 702 are surrounded by the housing 608 of the console 104. In some examples, the opening may be covered by a top. In such a case, the sensor surface 117 may lean against the top. In any case, the side walls 717 and the bottom 715 of the holder 702, except for the top, can comprise, or coated with an electromagnetic shielding material. Since the RFID reader 101 is resided in the holder 702 and have minimized or no ability to read through the side walls and the bottom of the holder 702, the RFID reader 101 can only read RFID tags positioned over the holder 702 and does not accidently read RFID tags of item(s) on the nearby shelves or other self-driving systems passing by that are not intended to be scanned, thereby reducing misreads of RFID tags that would otherwise result in delaying the subsequent packing and shipping process.

Suitable electromagnetic shielding materials may include conductive plastic, carbon material, conductive polymer, or any combination thereof. Some examples may include, but are not limited to, copper, aluminum, iron, any metal or metal composite having a high electromagnetic shield factor, graphene, graphite, carbon fiber, carbon nanotube, carbon powder, carbon black, ceramic materials such as ferrite, magnetic iron nanomaterial, silicon carbide, silica, or the like.

Figure 8:
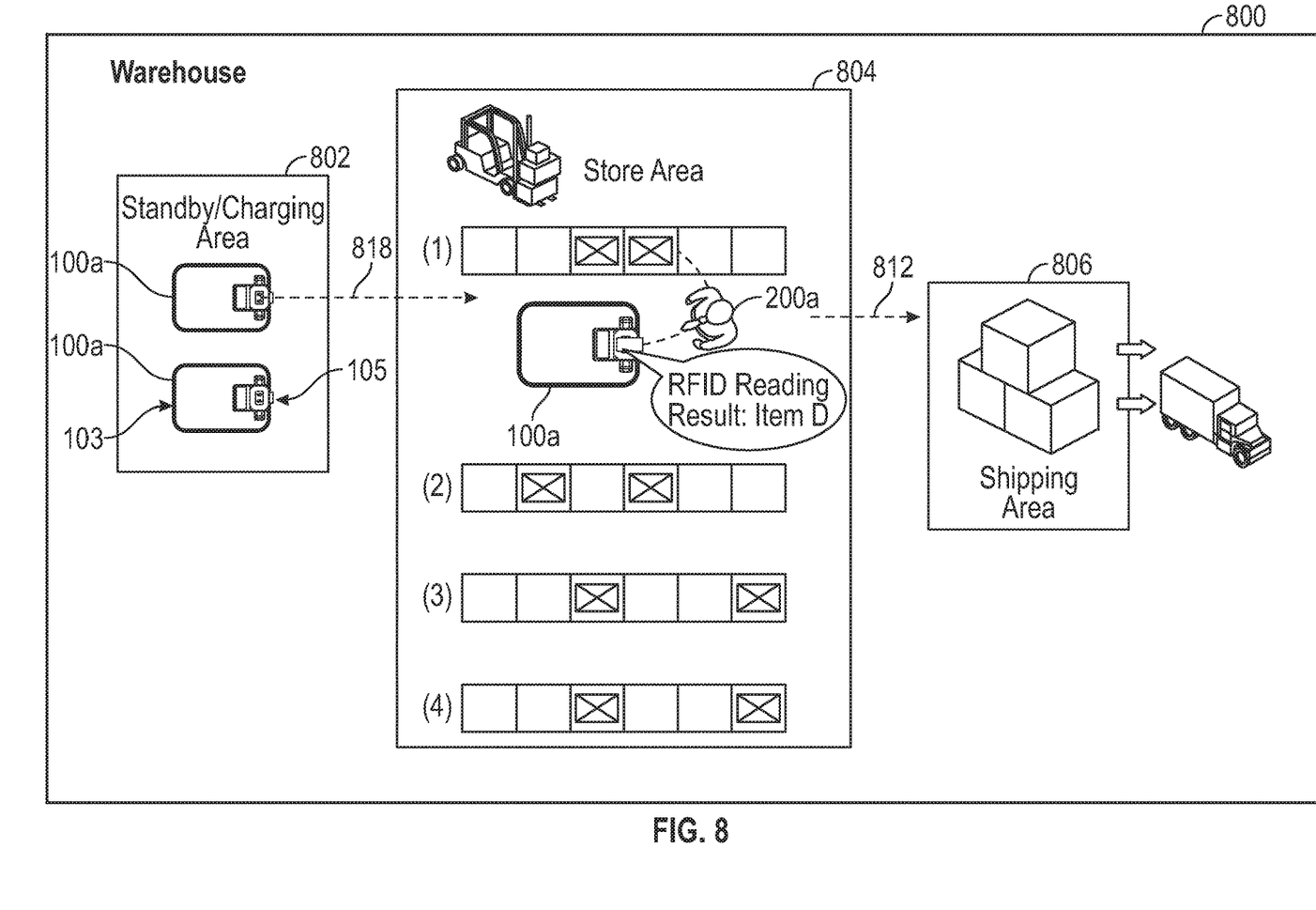
FIG. 8 is a schematic view of a warehouse using self-driving systems for transporting packages according to embodiments of the present disclosure.

FIG. 8 is a schematic view of a warehouse 800 using self-driving systems for transporting packages according to embodiments of the present disclosure. The warehouse 800 may include at least a standby/charging area 802, a store area 804, and a shipping area 806. A plurality of self-driving systems and one or more operators can transport and process packages in the warehouse 800. FIG. 8 schematically demonstrates an exemplary task performed by self-driving system 100*a*, which can have features identical to the self-driving system 100 discussed in this disclosure.

In one aspect, the self-driving system 100*a* may receive instructions from a remote server go to the store area 804. The self-driving system 100*a* waiting at the standby/charging area 802 may travel from the standby/charging area 802 to the store area 804 through route 818 under the self-navigating mode to meet with an operator 200*a*. Alternatively, the operator 200*a* may come to the standby/charging area 802 to interact with the self-driving system 100*a* through the touch screen on the display (e.g., display 108 discussed in FIG. 1). The self-driving system 100*a* can capture the image of the operator 200*a* and send the image to the remote server, which may then send a task instruction to the self-driving system 100*a* based on the role of the operator 200*a*. The self-driving system 100*a* receives and displays the task information on the display so that the operator 200*a* can decide whether to follow or to lead the self-driving system 100*a*.

If the operator 200*a* decides to follow the self-driving system 100*a*, the operator 200*a* may set the self-driving system 100*a* to the leading mode so that the operator 200*a* follows the self-driving system 100*a* to the store area 804. The operator 200*a* may also set the self-driving system 100*a* to the "following mode" through the display so that the self-driving system 100*a* follows the operator 200*a* to the store area 804. To follow the operator 200*a*, the self-driving system 100*a* may turn to move forward, with the front end 105 as the leading end, with the console 104 facing the operator 200*a*. In either case, the self-driving system 100*a* can use the camera 121 and/or 137 to capture the image of the operator 200*a* and abstract the characteristics of the operator 200*a*, such as facial features, clothing and/or pose of the operator, for purpose of leading or following the operator 200*a*.

The route 818 may be chosen by the remote server or selected by the self-driving system 100*a* based on the map information in the storage device of the self-driving system 100*a* or based on the positioning information obtained using UWB technology and/or markers/QR codes/barcodes within the facility to determine the best route for such task.

After arriving at the store area 804, the operator 200*b* may check the display of the self-driving system 100*a* to find out, or confirm the task instructions given to the operator 200*b*, which may include collecting X number of Item A from Shelf (1) to fulfill a purchase order from a customer Y. The operator 200*b* then move X number of Item A from the Shelf (1) to the self-driving system 100*b*. Once the required number of items have been collected, the operator 200*a* may scan the items using the RFID reader (e.g., RFID reader 101 discussed in FIG. 1) and print the shipping label associated with the purchase order. The operator 200 may pack the items, attach the shipping label to the packed items, and then send the self-driving system 100*a* loaded with the packed items directly to the shipping area 806. The self-driving system 100*a* may transport the packed items from the store area 804 to the shipping area 806 (or any other preferred location) through route 812 under the self-navigating mode. The self-navigating mode may be chosen by the remote server or selected by the self-driving system 100*a* based on the map information in the storage device of the self-driving system 100*a* or based on the positioning information obtained using UWB technology and/or markers/QR codes/barcodes within the facility to determine the best route for such task. In the self-navigating mode, the self-driving system 100*a* may move backwards, i.e., with the rear end 103 as the leading end. Alternatively, the operator 200*a* may instruct the self-driving system 100*a* to lead or follow the operator 200*a* to the shipping area 806 (or any other preferred locations).

In cases where the scanned item appears to be an item not belonging to the Shelf (1), the operator 200*a* may use a people/object recognition camera of the self-driving system 100*a* (e.g., camera 137 discussed in FIG. 1) to scan the marker/QR codes/barcodes of the item to confirm if the item is the correct item outlined in the purchase order or the task instruction. If the scanned item is identified to be the correct item, then the self-driving system 100*a* may require the operator 200*a* to replace the RFID tag found on the item with the correct RFID tag.

If the scanned item is identified to be a different item than the one required by the purchase order or the task instruction, then the operator 200*a* and/or the self-driving system 100*a* can determine if the item belongs to any of the nearby shelves. When the item belongs to a nearby shelf, the operator 200*a* will know, or be informed by the self-driving system 100*a* and/or the remote server, that the item was picked up in error and he/she can proceed to the correct shelf for that item. When the item does not belong to a nearby shelf and the correct item is far from the current location of the self-driving system 100*a* (e.g., the correct item is found to be Item D from Shelf (4)), the self-driving system 100*a* and/or the operator 200a may notify the remote server that item (s) on Shelf (1) do not match the record stored in the remote server and request that the content on Shelf (1) be updated to Item D in the remote server.

Figure 9:
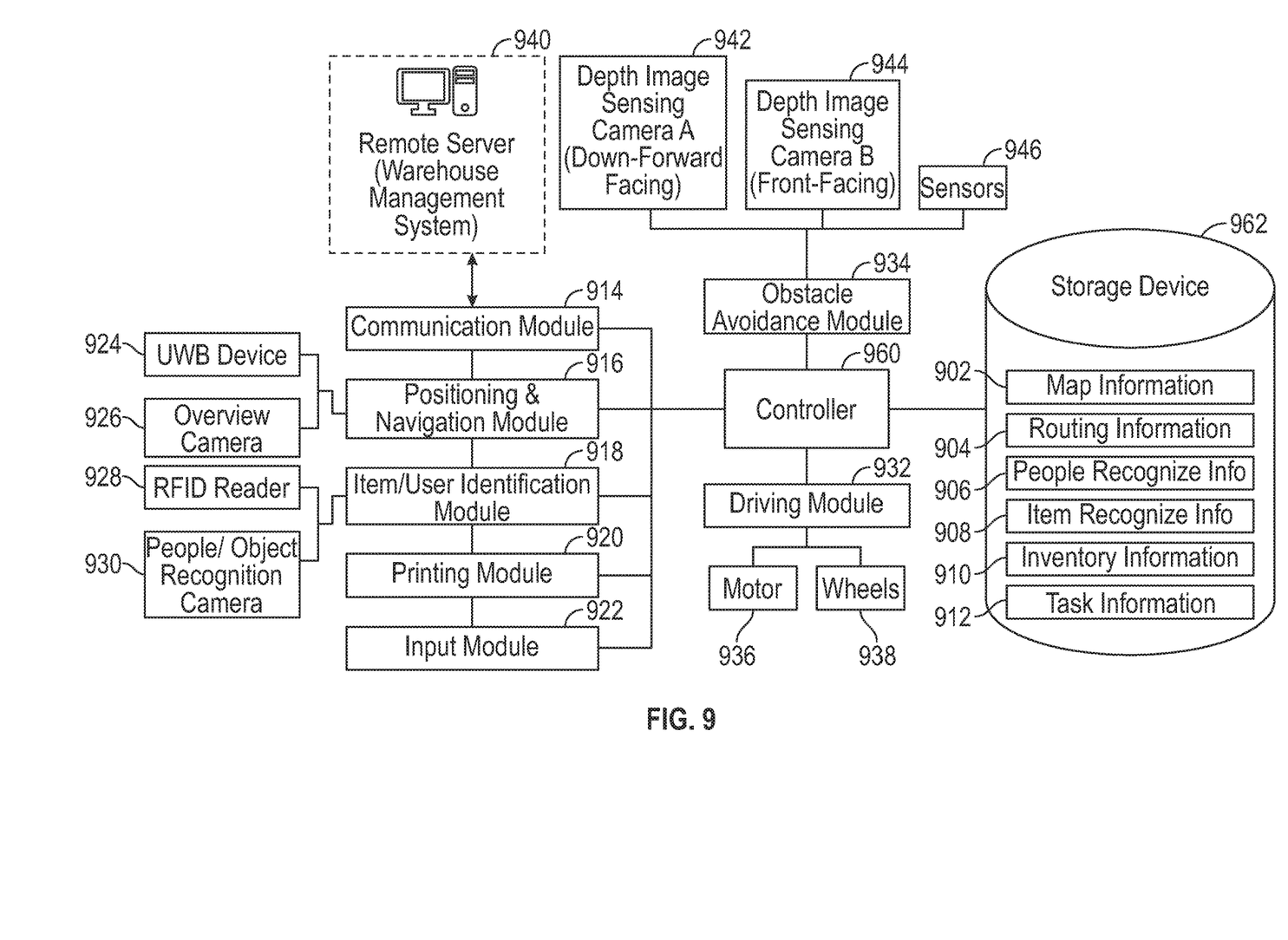
FIG. 9 is a block diagram of the self-driving system according to embodiments of the present disclosure.

FIG. 9 is a block diagram of the self-driving system 100 according to embodiments of the present disclosure. The self-driving system 100 includes a controller 960 configured to control various operations of the self-driving system 100, which may include any one or more embodiments discussed in this disclosure or any type of task as needed using the self-driving system 100. The controller 960 can be a programmable central processing unit (CPU) or any suitable processor that is operable with a memory. The controller 960 is in communication with a storage device 962 containing data for performing operations, such as map information 902, routing information 904, people recognition information 906, item recognition information 908, inventory information 910, task information 912, and the likes.

The controller 960 is also in communication with several modules configured to control the operations of the self-driving system 100. In some embodiments, the modules include a communication module 914, a positioning/navigation module 916, an item/user identification module 918, a printing module 920, and an input module 922. The communication module 914 is configured to transmit or receive information/instruction from a remote server 940, which may be a warehouse management system. The positioning/navigation module 916 is configured to communicate information regarding position/location of the self-driving system 100 to the controller 960. The positioning/navigation module 916 is in communication with an ultra-wideband (UWB) device 924 (e.g., UWB based device 610) and an overview camera 926 (e.g., camera 121). The item/user identification module 918 is configured to communicate information regarding RFID detection and transmission as well as image of item and/or operator. The item/user identification module 918 is in communication with a RFID reader 928 (e.g., RFID reader 101) and a people/object recognition camera 930 (e.g., camera 137). The printing module 920 is configured to receive information from the item/user identification module 918 and instruction from the operator and/or the controller 960. The printing module 920 is in communication with a printer (e.g., built-in printer 126) for printing a shipping label once a RFID tag of an item is scanned. The input module 922 is configured to provide and/or receive information to a display (e.g., display 108) of the self-driving system 100. The sensor module 918 is configured to control and receive information from the sensors (e.g., sensors 109, 156, 158) of the self-driving system 100.

The controller 960 is further in communication with a driving module 932 and an obstacle avoidance module 934. The driving module 932 is configured to control movement of the motorized wheels of the self-driving system 100. The driving module 932 is in communication with a motor 936 (e.g., motorized wheels 110) and wheels 938 (e.g., stabilizing wheels 112). The obstacle avoidance module 934 is configured to capture of object/obstacle for object identification and/or obstacle avoidance. The obstacle avoidance module 934 is in communication with depth image sensing cameras 942, 944 and a plurality sensors 946. The depth image sensing camera 942 can be a down-forward facing camera (e.g., camera 111) and the depth image sensing camera 944 can be a front-facing camera (e.g., camera 144). The sensors 946 can include any sensors suitable for detecting the presence of objects nearby and/or measure distances between the objects and the self-driving system 100 (e.g., sensors 109, 156, 158).

The controller 960 is configured to control the movement and tasks to be performed by the self-driving system 100, based at least in part on the information received from the storage device 962, the positioning/navigation module 916, user input and/or the remote server. In one exemplary embodiment, the controller 960 can use the communication module 914 to receive task information 912 from the remote server 940, which may require X number of Item A be collected to fulfill a purchase order. The controller 960 controls the self-driving system 100 to proceed to a target area (e.g., a store area) using the driving module 932 and meet with an operator. Information regarding the operator can be stored on the storage device 962 and accessed by the controller 960 and/or the operator. Information regarding the location of the shelf can also be stored on the storage device 962 and accessed by the controller 960 and/or an operator for future reference as needed. At any time, the controller 960 can retrieve data from the positioning/navigation module 916 and information stored on the storage device 962, including the map information 902, the routing information 904, the inventory information 910, and/or the task information 912, and/or the people recognition information 906 to help identify the correct shelf for the item A and operator suitable for performing the task based on the image and characteristics of the operator using the UWB based device 924, the overview camera 926 and the people/object recognition camera 930. The controller 960 can also instruct the self-driving system 100 to avoid obstacle based on the data from the obstacle avoidance module 934 using the depth image sensing cameras 942, 944 and sensors 946.

Once arriving at the target area, the operator may collect the required number of Item A based on the task information provided to the input module 922. The operator scans the RFID tags on the item A, by positioning the item A over the RFID reader 928, to identify the item. In some cases, the people/object recognition camera 930 can also be used to identify/confirm the item. If the scanned information does not match the inventory information stored in the remote server 940, the operator is notified via the input module 922. The operator may then proceed with the procedure described in FIG. 8. Once the correct number of Item A has been collected, the operator may pack the Items A in a shipping box and instruct the self-driving system 100 to print the shipping label associated with the purchase order. The controller 960 then obtain the shipping information from the storage device 962 and/or the remote server 940 and send the same to the printing module 920 for printing the shipping label. Once the shipping label is attached to the box, the operator may send the self-driving system 100 to a target area (e.g., a shipping area). The self-driving system 100 may continue operation and the process described above may be repeated until all the purchase orders are fulfilled.

While the foregoing is directed to embodiments of the disclosure, other and further embodiments of the disclosure thus may be devised without departing from the basic scope thereof, and the scope thereof is determined by the claims that follow.

The invention claimed is:

1. A self-driving system, comprising:
   a mobile base having a first end and a second end opposing the first end, the mobile base having one or more motorized wheels;
   a console having a display, the console coupling in an upright position to the mobile base;

a RFID reader integrated with the console, the RFID reader having a sensor surface operable to read RIFD tags placed on, over, or directly over the sensor surface;

a printer integrated with the console, the printer has a paper discharge port disposed at a side of the console;

a display coupled to the console;

a first camera disposed at the display, the first camera facing the first end and being operable to identify an operator;

a second camera disposed at the console, the second camera facing the first end and being operable to detect a low-profile object, the second camera pointing to a direction that is at 30 degrees to 85 degrees with respect to the longitudinal direction of the console;

a third camera disposed at the console, the third camera facing the first end and being operable to detect an object so that a pre-determined distance is maintained between the self-driving system and the object; and a fourth camera disposed at the mobile base, the fourth camera facing the first end and being operable to detect an obstacle, the fourth camera pointing to a direction that is at 60 degrees to 125 degrees with respect to the longitudinal direction of the console.

2. The self-driving system of claim 1, further comprising:
a roll paper feeder disposed at the console; and
a paper discharge port operable to discharge a paper sheet from the roll paper feeder.

3. The self-driving system of claim 1, further comprising:
an ultra-wideband (UWB) based device coupled to the console, the UWB based device being operable to determine position of the self-driving system.

4. The self-driving system of claim 1, further comprising:
a basket disposed at a side of the console.

5. The self-driving system of claim 1, wherein the RFID reader is disposed in a holder, the holder has a bottom and side walls extending upwardly from the bottom, and the bottom and side walls comprise an electromagnetic shielding material.

6. A self-driving system, comprising:
a mobile base having a first end and a second end opposing the first end;
a console coupled to the mobile base, the console having a longitudinal direction that is perpendicular to traveling direction of the self-driving system;
a display coupled to the console;
a RFID reader coupled to the console, wherein the RFID reader has a sensor surface operable to read RIFD tags placed over the sensor surface;
a printer coupled to the console;
a first camera disposed at the display, the first camera facing the first end and being operable to identify an operator;
a second camera disposed at the console, the second camera facing the first end and being operable to detect a low-profile object, the second camera pointing to a direction that is at 30 degrees to 85 degrees with respect to the longitudinal direction of the console;
a third camera disposed at the console, the third camera facing the first end and being operable to detect an object so that a pre-determined distance is maintained between the self-driving system and the object; and
a fourth camera disposed at the mobile base, the fourth camera facing the first end and being operable to detect an obstacle, the fourth camera pointing to a direction that is at 60 degrees to 125 degrees with respect to the longitudinal direction of the console.

7. The self-driving system of claim 6, wherein the mobile base comprises one or more motorized wheels.

8. The self-driving system of claim 6, wherein the console is coupled in an upright position to the mobile base.

9. The self-driving system of claim 6, wherein the printer has a paper discharge port disposed at a first side of the console.

10. The self-driving system of claim 6, further comprising:
a roll paper feeder disposed at the console disposed at a second side of the console opposite the first side.

11. The self-driving system of claim 6, further comprising:
a positioning device coupled to the console.

12. The self-driving system of claim 6, further comprising:
a basket disposed at a side of the console.

13. The self-driving system of claim 6, wherein the RFID reader is disposed in a holder, the holder has a bottom and side walls extending upwardly from the bottom, and the bottom and side walls comprise an electromagnetic shielding material.

14. A self-driving system, comprising:
a mobile base having one or more motorized wheels;
a console having a display, the console coupling in an upright position to the mobile base, the console having a longitudinal direction that is perpendicular to traveling direction of the self-driving system;
a RFID reader coupled to the console, the RFID reader having a sensor surface operable to read RIFD tags placed over the sensor surface;
a printer coupled to the console;
a first camera disposed at the display, the first camera being operable to identify an operator;
a second camera disposed at the console, the second camera being operable to detect a low-profile object, the second camera pointing to a direction that is at 30 degrees to 85 degrees with respect to the longitudinal direction of the console;
a third camera disposed at the console, the third camera being operable to detect an object so that a pre-determined distance is maintained between the self-driving system and the object; and
a fourth camera disposed at the mobile base, the fourth camera being operable to detect an obstacle, the fourth camera pointing to a direction that is at 60 degrees to 125 degrees with respect to the longitudinal direction of the console.

15. The self-driving system of claim 14, further comprising:
a roll paper feeder disposed at the console; and
a paper discharge port operable to discharge a paper sheet from the roll paper feeder.

16. The self-driving system of claim 14, further comprising:
a positioning device coupled to the console.

17. The self-driving system of claim 16, wherein the positioning device is an ultra-wideband (UWB) based device.

* * * * *